United States Patent
Hansen

(10) Patent No.: US 11,441,544 B2
(45) Date of Patent: Sep. 13, 2022

(54) METHOD OF OPERATING FLOATING OFFSHORE WIND TURBINES

(71) Applicant: Vestas Wind Systems A/S, Aarhus N. (DK)

(72) Inventor: Jesper Rømer Hansen, Risskov (DK)

(73) Assignee: Vestas Wind Systems A/S, Aarhus N (DK)

(*) Notice: Subject to any disclaimer, the term of this patent is extended or adjusted under 35 U.S.C. 154(b) by 25 days.

(21) Appl. No.: 17/059,763

(22) PCT Filed: Jun. 13, 2019

(86) PCT No.: PCT/EP2019/065478
§ 371 (c)(1),
(2) Date: Nov. 30, 2020

(87) PCT Pub. No.: WO2019/243152
PCT Pub. Date: Dec. 26, 2019

(65) Prior Publication Data
US 2021/0301792 A1    Sep. 30, 2021

(30) Foreign Application Priority Data

Jun. 18, 2018 (EP) ...................... 8178193

(51) Int. Cl.
*F03D 17/00* (2016.01)
*F03D 13/40* (2016.01)

(52) U.S. Cl.
CPC ............ *F03D 17/00* (2016.05); *F03D 13/40* (2016.05); *F05B 2240/93* (2013.01); *F05B 2260/821* (2013.01); *F05B 2260/84* (2013.01)

(58) Field of Classification Search
CPC .......... F03D 13/40; F03D 17/00; F03D 80/50; F05B 2230/80; F05B 2240/93; F05B 2260/821; F05B 2260/84
See application file for complete search history.

(56) References Cited

U.S. PATENT DOCUMENTS

| | | | |
|---|---|---|---|
| 2009/0281675 A1* | 11/2009 | Rasmussen | F03D 17/00 290/44 |
| 2011/0074155 A1 | 3/2011 | Scholte-Wassink | |
| 2018/0148140 A1* | 5/2018 | Fernandez Gomez | B63B 21/502 |

FOREIGN PATENT DOCUMENTS

| | | |
|---|---|---|
| EP | 2267297 A2 | 12/2010 |
| EP | 2743500 A1 | 6/2014 |

(Continued)

OTHER PUBLICATIONS

Machine translation of KR 10-1757117, Duketai, published Jul. 11, 2017 (Year: 2017).*

(Continued)

*Primary Examiner* — Richard A Edgar
*Assistant Examiner* — Jason G Davis
(74) *Attorney, Agent, or Firm* — Wood Herron & Evans LLP

(57) ABSTRACT

A method for operating at least two floating offshore wind turbines (1) is disclosed. The wind turbines (1) are operated at respective first operating positions (7), and a previous and/or a future expected wear impact on each wind turbine (1) is estimated. At least one wind turbine (1) to be relocated to a respective second operating position (9) is identified, based on the estimated wear impact. The identified wind turbines (1) are moved to respective second operating position (9) and operated there.

13 Claims, 5 Drawing Sheets

(56) References Cited

FOREIGN PATENT DOCUMENTS

EP          2933181 A1    10/2015
KR       101757117 B1 *   7/2017  ............ F03D 80/50

OTHER PUBLICATIONS

European Patent Office, European Search Report in EP Application No. 18178193.1, dated Jan. 4, 2019.
European Patent Office, International Search Report and Written Opinion in PCT Application No. PCT/EP2019/065478, dated Sep. 10, 2019.
Rongyong Zhao et al., Fatigue distribution optimization for offshore wind farms using intelligent agent control: Fatigue distribution optimization for offshore wind farms, Wind Energy, vol. 15, No. 7, Jun. 27, 2021 (Jun. 27, 2012), pp. 927-944, XP055532139, GB ISSN: 1095-1244, DOI: 10-.1002/we.1518.

* cited by examiner

METHOD OF OPERATING FLOATING OFFSHORE WIND TURBINES

FIELD OF THE INVENTION

The present invention relates to a method of operating at least two floating offshore wind turbines. The wind turbines are operated in a manner, which provides an improved lifetime and/or an improved power production for each of the wind turbines.

BACKGROUND OF THE INVENTION

When wind turbines are arranged in a wind farm, the wear impact on the wind turbines may variate across the wind farm. For instance, wind turbines arranged near the boundary of the wind farm may experience higher loads and/or higher wear impact than wind turbines arranged in the central part of the wind farm, because the wind turbines arranged in the central part of the wind farm are arranged in the wake of other wind turbines. Furthermore, wind turbines being arranged along a boundary of the wind farm, which faces a dominating wind direction may experience higher wear impact than the other wind turbines of the wind farm.

Accordingly, some of the wind turbines of a wind farm may be worn out well before their design lifetime, while other wind turbines of the wind farm may exceed their design lifetime.

EP 2 267 297 A2 discloses a floating offshore wind farm including a plurality of wind turbines. A movable mooring mechanism moors the wind turbines on the ocean floor while maintaining relative positions of the wind turbines. The ends of the mooring cables are wound on winding devices used as drive devices that change the tension of the mooring cables. Thereby the relative positions of the wind turbines can be changed, depending on the wind direction, in order to reduce the total number of rotors entering a wake flow of another rotor.

EP 2 933 181 B1 discloses a method for maintaining a floating-body type wind turbine power generating apparatus. A wind turbine is disposed on a floating body moored at a mooring position by a mooring line. The mooring line is separated from the floating body of the wind turbine and transferred from the mooring position to a maintenance position. Another wind turbine is transferred to the mooring position and connected to the mooring line.

DESCRIPTION OF THE INVENTION

It is an object of embodiments of the invention to provide a method for operating at least two floating offshore wind turbines in a manner which ensures an improved power production and/or an improved lifetime for each of the wind turbines.

The invention provides a method for operating at least two floating offshore wind turbines, each wind turbine being connected to a mooring arrangement at a respective first operating position, the method comprising the steps of:
- operating the wind turbines at their respective first operating positions,
- for each of the wind turbines, estimating a previous and/or a future expected wear impact on the wind turbine,
- identifying at least one wind turbine to be relocated to a respective second operating position, based on the estimated wear impact,
- disconnecting each identified wind turbine from the mooring arrangement of its first operating position,
- moving each identified wind turbine from its respective first operating position to its respective second operating position,
- connecting each identified wind turbine to a mooring arrangement at its respective second operating position, and
- operating the wind turbines at the respective second operating positions.

Thus, the invention relates to a method for operating at least two floating offshore wind turbines. In the present context the term 'floating offshore wind turbine' should be interpreted to mean a wind turbine which is positioned at an offshore site, e.g. at sea, and which is mounted on a floating foundation rather than on a foundation which is fixed to the seabed.

Each wind turbine is connected to a mooring arrangement at a respective first operating position. In the present context the term 'mooring arrangement' should be interpreted to mean an arrangement comprising one or more mooring lines connected at one end to anchors or foundations fixed at the seabed and at another end to the floating foundation of the wind turbine.

Initially, the wind turbines are operated at their respective first operating positions. The respective first operating positions are arranged at fixed positions relative to each other, the fixed positions being defined by the positions of the mooring arrangements. Thereby the wind turbines themselves are also arranged at fixed positions relative to each other even though limited variation in position is possible by varying of length or tension of mooring lines. When the wind turbines are operated, they produce power in a usual manner by extracting the energy of the wind by means of wind turbine blades and transforming the energy of the wind into electrical energy, which is supplied to a power grid.

During operation of the wind turbines at their respective first operating positions, a previous and/or future expected wear impact on the wind turbine is estimated for each of the wind turbines. The wear impact for the respective wind turbines is estimated while taking the respective first operating positions of the wind turbines into account. As described above, the load and wear on a wind turbine is dependent on the position of the wind turbine relative to other wind turbines positioned in the vicinity thereof. For instance, wind turbines arranged in the prevailing direction of the incoming wind will normally experience higher loads and more wear than wind turbines arranged in the wake of other wind turbines. Similarly, wind turbines in a wake of other wind turbines may experience more turbulence in the received air flow, which yields other types of wear. Accordingly, the wear impact on the wind turbines will normally vary across a wind farm.

Next, at least one wind turbine to be relocated to a respective second operating position is identified, based on the estimated wear impact. For instance, in the case that a wind turbine has experienced, or is expected to experience in the future, a wear impact, which is higher than an average or design wear impact, it may be desirable to relocate the wind turbine to an operating position where the expected wear impact is lower than the expected wear impact at the first operating position of the wind turbine. Thereby the total design lifetime wear impact on the wind turbine can be reduced, and the expected lifetime of the wind turbine can be maintained or increased. Furthermore, the power production of the wind turbine while it was operating at the first operating position may very well have been higher than a design power production, and thereby the total power production of the wind turbine during its lifetime can be improved.

Similarly, in the case that a wind turbine has experienced, or is expected to experience in the future, a wear impact which is lower than an average or design wear impact, it may be desirable to relocate the wind turbine to an operating position where the expected wear impact is higher than the expected wear impact at the first operating position of the wind turbine.

Next, each identified wind turbine is disconnected from the mooring arrangement of its first operating position and moved from its respective first operating position to its respective second operating position. Each identified wind turbine is then connected to the mooring arrangement at its second operating position, and the wind turbines are operated at their respective second operating positions.

Typically, all wind turbines in an offshore wind farm are decommissioned at the same time. Thus, according to the method of the invention, the wind turbines are relocated, based on an estimated wear impact. Thereby the total lifetime power production of the wind farm can be improved, e.g. by obtaining uniform wear impact and hence safe service lifetime of the wind turbines across a wind farm.

The step of estimating a previous and/or a future expected wear impact on each of the wind turbines may be based on a location of the operating positions of the wind turbines relative to a prevailing wind direction. As described above, wind turbines, which are directly facing the incoming wind, are expected to experience higher wear than wind turbines arranged in the wake of other wind turbines. Accordingly, wind turbines arranged in such a manner that they directly face a prevailing or dominating wind direction will most likely experience a higher wear impact than the other wind turbines. Accordingly, the locations of the operating positions of the wind turbines relative to the prevailing wind direction provide valuable information regarding the expected wear impact on the wind turbines (for example based on historical data after installation of the wind turbines), as well as regarding the future expected wear impact (for example based on modelling).

Alternatively or additionally, the step of estimating a previous and/or a future expected wear impact on each of the wind turbines may comprise estimating a lifetime usage of each of the wind turbines. In the present context, the term 'lifetime usage' should be interpreted to mean a fraction of a design lifetime of the wind turbine which has been used at a given time. Wind turbines are normally designed to have a given design lifetime, for instance 20 years.

Ideally, the lifetime usage of a wind turbine is substantially linear. However, there may be periods of time, where the lifetime usage rate is higher than the anticipated lifetime usage rate and periods of time, where the lifetime usage rate is lower than the anticipated lifetime usage rate. As described above, the position of the wind turbine relative to other wind turbines and relative to the incoming wind has a significant influence on the wear impact on the wind turbine, and thereby on the lifetime usage.

Accordingly, in the case that the lifetime usage of a given wind turbine is lower than expected at a given time, this may indicate that the wear impact at the first operating position of that wind turbine is low, and it may therefore be advantageous to relocate this wind turbine to an operating position with a higher expected wear impact, and thereby a higher lifetime usage rate.

Similarly, in the case that the lifetime usage of a given wind turbine is higher than expected at a given time, this may indicate that the wear impact at the first operating position of that wind turbine is high, and it may therefore be advantageous to relocate this wind turbine to an operating position with a lower expected wear impact, and thereby a lower lifetime usage rate.

Thus, the lifetime usage is suitable for estimating the wear impact on the wind turbines, in particular the previous wear impact.

The step of estimating previous and/or future expected wear impact may comprise modelling meteorological and/or oceanic conditions, and estimating future expected wear impact based on the modelling. Meteorological conditions may include wind speed, wind direction, gust conditions, wind shear, temperature, humidity, etc. Oceanic conditions may include wave conditions, current conditions, etc. The modelling may be based on weather forecasts or the like.

Meteorological conditions and oceanic conditions have a great influence on the wear impact on the wind turbines. It is therefore appropriate to use modelling of such conditions for predicting a future wear impact on the wind turbines.

The applied models may be based on historical data regarding the meteorological conditions and/or oceanic conditions and wear impact, as well as extreme events like tsunamis, typhoons, impact from failing components, (volcanic) particles, insects or bird migration impacts events, etc. Historic wear impact may also be measured or estimated based on destructive or non-destructive analysis of failed or operating components. In one embodiment, the step of estimating a previous and/or a future expected wear impact on the wind turbine may be conducted after one of these extreme events.

The step of estimating previous and/or future expected wear impact may be performed on the basis of sensor data obtained at the respective first and/or second operating positions. The sensor data may, e.g., be obtained by means of sensors mounted on wind turbines operating at the respective operating positions. The sensors may, e.g., be in the form of load sensors, strain gauges, temperature sensors, wind sensors, rain sensors, etc. According to this embodiment, the wear impact on a given wind turbine may be estimated on the basis of sensor data which is indicative for an actual load on the wind turbine or which indicate other actual conditions, which the wind turbine is subjected to.

The step of identifying at least one wind turbine may comprise identifying at least one wind turbine with an experienced high wear impact, and the step of moving each identified wind turbine may comprise moving the at least one wind turbine with a high wear impact to a second operating position which provides an expected future wear impact, which is lower than an expected future wear impact at the first operating position of the wind turbine.

According to this embodiment, a wind turbine, which has been subjected to a high wear impact, e.g. a wind turbine with a high lifetime usage, at its first operating position, may be moved to a second operating position where the expected future wear impact is lower. Thereby, the increase rate of total wear impact on the wind turbine is reduced, e.g. to the extent that a design lifetime for the wind turbine is obtained.

Alternatively or additionally, the step of identifying at least one wind turbine may comprise identifying at least one wind turbine with an experienced low wear impact, and the step of moving each identified wind turbine may comprise moving the at least one wind turbine with a low wear impact to a second operating position, which provides an expected future wear impact, which is higher than an expected future wear impact at the first operating position of the wind turbine.

According to this embodiment, a wind turbine, which has been subjected to a low wear impact, e.g. a wind turbine with a low lifetime usage, at its first operating position, may be moved to a second operating position where the expected future wear impact is higher. Thereby the total wear impact on the wind turbine is increased, e.g. to the extent that a design lifetime for the wind turbine is obtained.

The method may further comprise the step of performing maintenance on at least one wind turbine and/or replacing or upgrading at least one component of at least one wind turbine. Maintenance could, e.g., be performed on a drive train, a generator, a hub, wind turbine blades, a tower, electrical components, etc. of the wind turbine. Wind turbine components such as one or more drive train components, a generator, one or more wind turbine blades, a hub, etc. may be replaced or upgraded.

The step of performing maintenance and/or replacing at least one component may be performed after the step of operating the wind turbines at their respective first operating positions and before the step of operating the wind turbines at their respective second operating positions.

According to this embodiment, the maintenance and/or replacement or upgrading of at least one component takes place while the wind turbine is not operating, due to the relocation of the wind turbine from the first operating position to the second operating position. Thereby the maintenance and/or replacement or upgrading of at least one component does not give rise to additional power production loss. For instance, the maintenance and/or replacement or upgrading of at least one component may take place during the step of moving the wind turbine from its first operating position to its second operating position.

The respective second operating position of at least one wind turbine may be a respective first operating position of another wind turbine. According to this embodiment, at least some of the wind turbines may be relocated within a wind farm, for instance in such a manner that wind turbines at high wear impact operating positions switch place with wind turbines at low wear impact operating positions. Thereby all wind turbines of the wind farm will be subjected to a substantially uniform total wear impact, and the wind turbines will most likely be worn out at substantially the same point in time. Furthermore, the total power production of the wind farm can be improved or even optimised.

The method may further comprise the steps of:
disconnecting at least one wind turbine from the mooring arrangement of its respective second operating position,
moving the wind turbine from its respective second operating position to a respective third operating position,
connecting the wind turbine to a mooring arrangement at the respective third operating position, and
operating the wind turbine at the respective third operating position.

According to this embodiment, at least one of the wind turbines is subsequently relocated to a third operating position. The third operating position could, e.g., be an operating position with a very low expected wear impact, where wind turbines, which are close to or have exceeded their expected lifetime can continue operating with a low power output and low wear impact.

BRIEF DESCRIPTION OF THE DRAWINGS

The invention will now be described in further details with reference to the accompanying drawings in which.

DETAILED DESCRIPTION OF THE DRAWINGS

Figure 1:
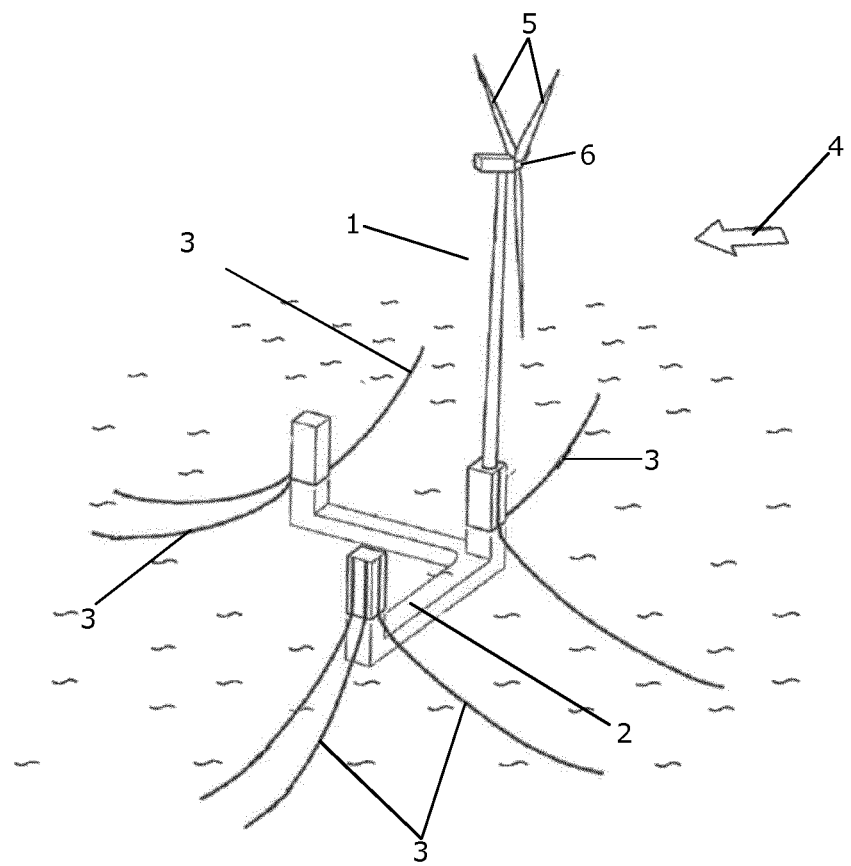
FIG. 1 shows a floating offshore wind turbine operating at a first operating position.

FIGS. 1-4 illustrate steps of a method according to an embodiment of the invention. FIG. 1 shows a floating offshore wind turbine 1 mounted on a floating foundation 2, which is attached to a mooring arrangement via mooring lines 3 at a first operating position. The number of mooring lines 3, and whether these mooring lines 3 are connected to the sea floor or to other structures depend on design choices and can hence be optimized by the skilled person.

The wind direction is illustrated by arrow 4. Wind acts on wind turbine blades 5 of the wind turbine 1, causing a rotor 6 to rotate. The rotor 6 is connected to a generator, possibly via a gear system, and thereby the rotating movements of the rotor 6 results in production of electrical power. The produced electrical power is supplied to a power grid (not shown), optionally via a transformer station (not shown). Accordingly, the wind turbine 1 of FIG. 1 is operating in a normal manner at the first operating position.

During operation of the wind turbine 1, a wear impact on the wind turbine 1 is estimated. The estimated wear impact could include previous experienced wear impact, i.e. wear impact which the wind turbine 1 has already been subjected to, and/or expected future wear impact, i.e. wear impact which the wind turbine 1 may be expected to be subjected to if it continues to operate at the first operating position.

Based on the estimated wear impact it is determined whether or not the wind turbine 1 shall be relocated to a second operating position. For instance, in the case that the previous and/or expected future wear impact is higher than expected, e.g. to an extend which results in a reduced expected lifetime of the wind turbine 1, it may be desirable to relocate the wind turbine 1 to a second operating position, where the expected future wear impact is lower than at the first operating position.

Similarly, in the case that the previous and/or expected future wear impact is lower than expected, e.g. to an extend which results in an expected lifetime of the wind turbine 1, which exceeds the design lifetime of the wind turbine 1, it may be desirable to relocate the wind turbine 1 to a second operating position, where the expected future wear impact is higher than at the first operating position. Thereby it may be possible to increase the power production of the wind turbine 1 without exceeding the design lifetime of the wind turbine 1.

Figure 2:
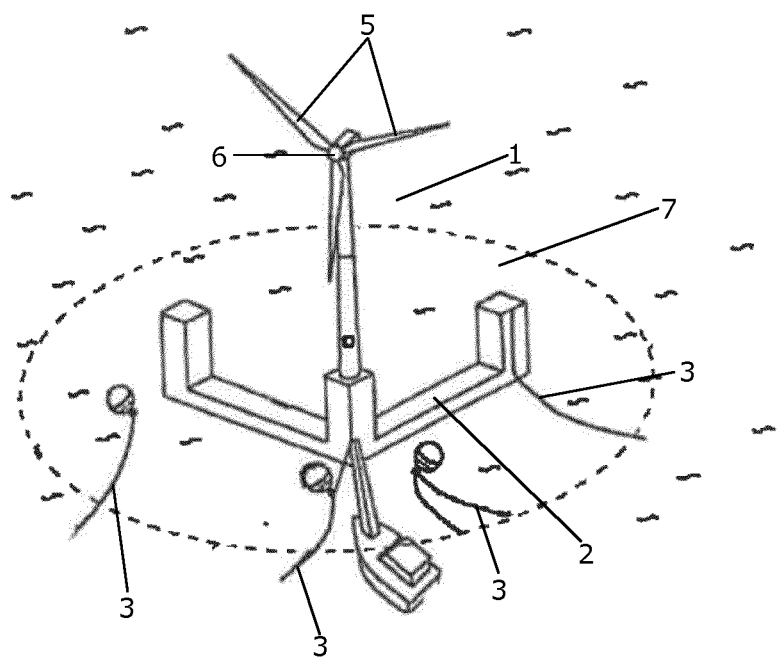
FIG. 2 shows the floating offshore wind turbine of FIG. 1 being detached from a mooring arrangement at the first operating position.

FIG. 2 shows the floating offshore wind turbine 1 of FIG. 1 at the first operating position 7. In the situation illustrated in FIG. 2 it has been determined to relocate the wind turbine to a second operating position. The wind turbine 1 has therefore been detached from at least some of the mooring lines 3, and thereby the wind turbine 1 is ready to be moved from the first operating position 7 to the second operating position.

Figure 3:
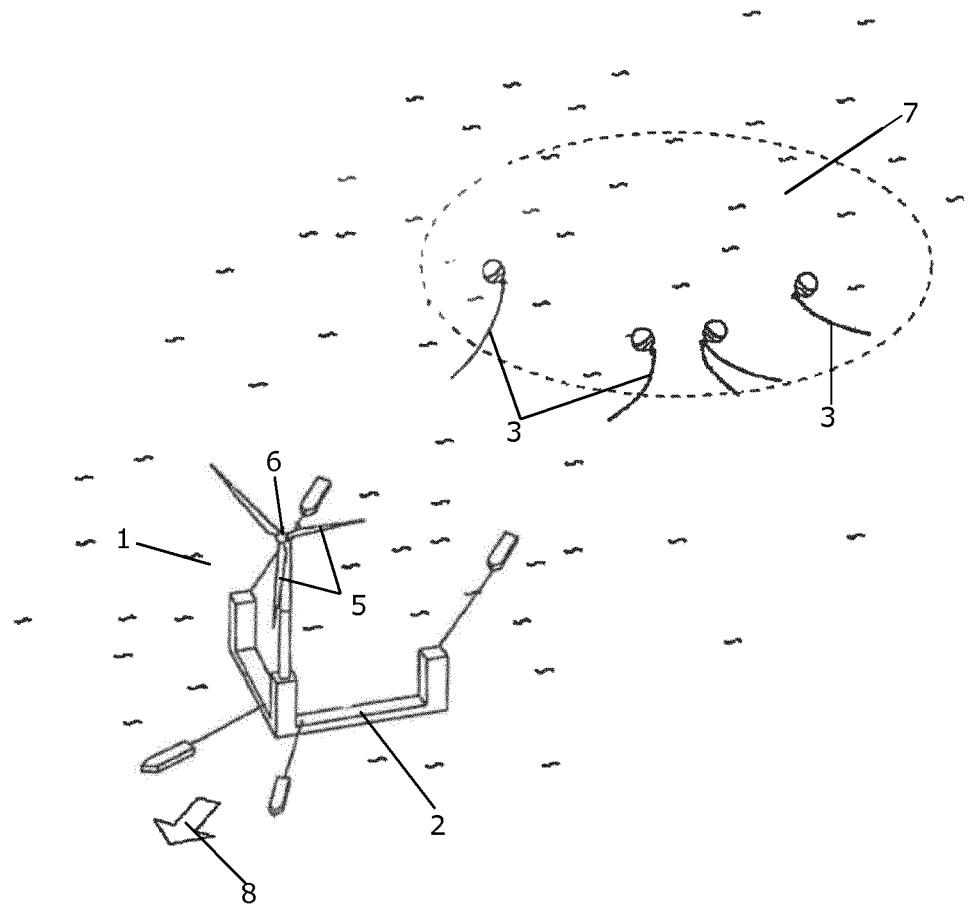
FIG. 3 shows the floating offshore wind turbine of FIGS. 1 and 2 being moved from the first operating position.

In FIG. 3 the wind turbine 1 has been moved away from the first operating position 7 along a direction indicated by arrow 8. Accordingly, the wind turbine 1 is on its way towards its second operating position.

Figure 4:
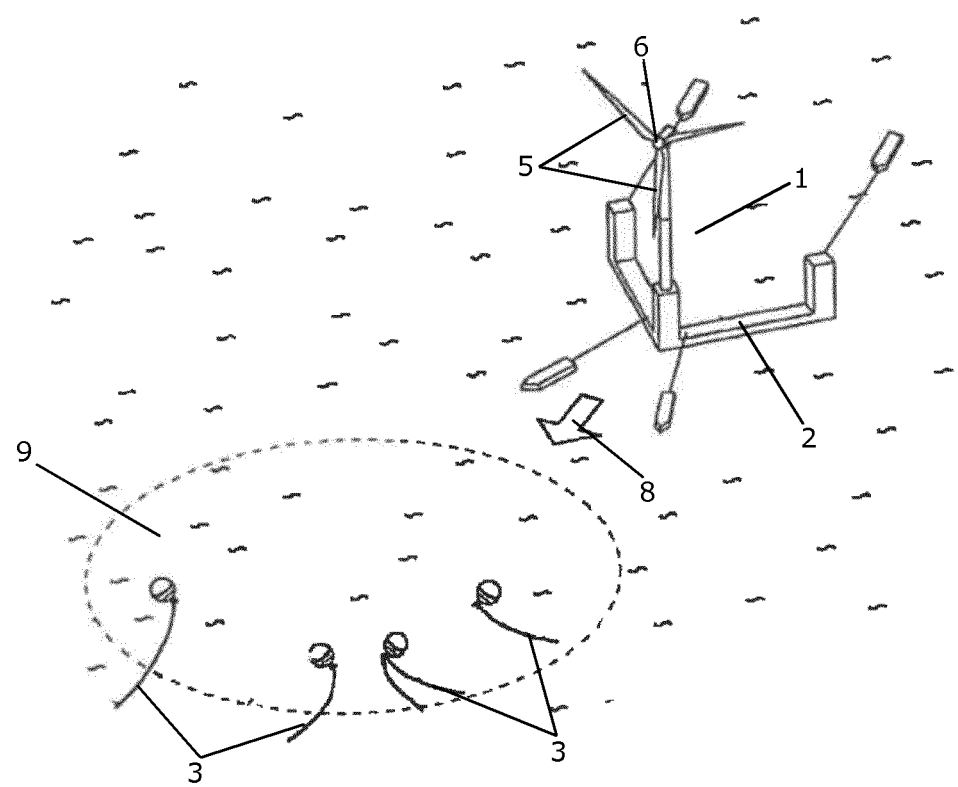
FIG. 4 shows the floating offshore wind turbine of FIGS. 1-3 being moved towards a second operating position.

In FIG. 4 the wind turbine 1 is approaching the second operating position 9. Once the wind turbine 1 has reached the second operating position 9 the floating foundation 2 of the wind turbine 1 is attached to the mooring lines 3 of the second operating position 9, and the wind turbine 1 will be ready to start operating at the second operating position 9, after connection to the power grid. The second operating position 9 may previously have been utilized for operation of another wind turbine, however, this is not a requirement. If the second operating position was previously used by another wind turbine, then this wind turbine may previously have been moved to another position (which optionally may be the first position of wind turbine 1), or decommissioned.

In one embodiment, the first operating position is in a first wind farm and the second operating position is in a second wind farm different from the first wind farm for at least one of the floating wind turbines. This for example allows a wind turbine that has experienced an extreme event in a first wind farm to be moved to another wind farm with a much lower risk of experiencing another extreme event.

Figure 5:
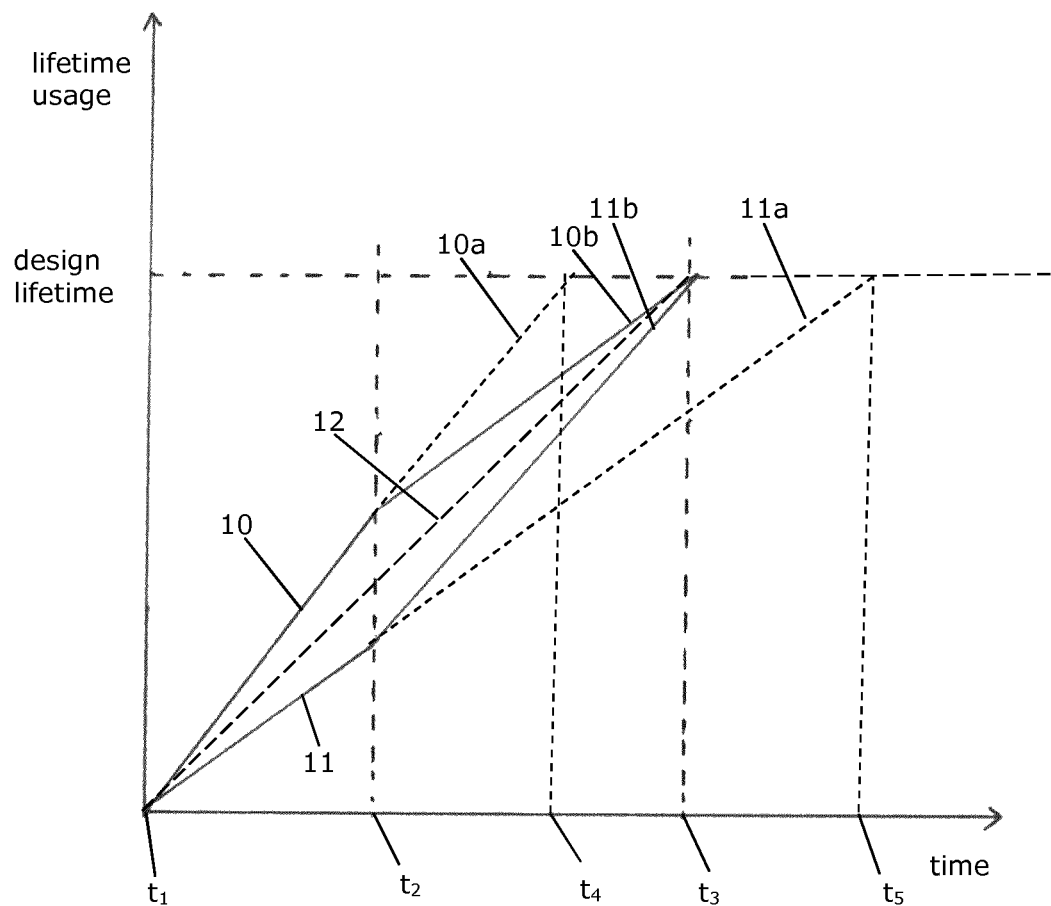
FIG. 5 is a graph illustrating lifetime usage as a function of time for two floating offshore wind turbines being operated in accordance with a method according to an embodiment of the invention.

FIG. 5 is a graph illustrating lifetime usage as a function of time for two wind turbines. The wind turbines start operating at time $t_1$. A first wind turbine, represented by curve 10, is initially operated at a respective first operating position where the wear impact on the wind turbine is higher than a design wear impact 12. Accordingly, the lifetime usage of this wind turbine is higher than anticipated, and continued operation of the wind turbine under these operating conditions, following line 10a, would result in the wind turbine being worn out prematurely at time $t_4$.

A second wind turbine, represented by curve 11, is initially operated at a respective first operating position where the wear impact on the wind turbine is lower than the design wear impact. Accordingly, the lifetime usage of this wind turbine is lower than anticipated, and continued operation of the wind turbine under these operating conditions, following line 11a, would result in the wind turbine exceeding its design lifetime until time $t_5$.

At time $t_2$ the lifetime usage of the wind turbines represented by curves 10 and 11 is evaluated, and the deviations from the design lifetime usage rate described above are identified. As a consequence, it is decided to relocate the wind turbines to respective second operating positions. More particularly, the wind turbine represented by curve 10 is relocated to a second operating position having an expected future wear impact, represented by curve 10b, which is lower than the expected future wear impact of the first operating position for this wind turbine. Similarly, the wind turbine represented by curve 11 is relocated to a second operating position having an expected future wear impact which is higher than the expected future wear impact, represented by curve 11b, of the first operating position for this wind turbine.

Accordingly, the lifetime usage rate of the wind turbine represented by curve 10 is decreased from time $t_2$, and the lifetime usage rate of the wind turbine represented by curve 11 is increased from time $t_2$.

As a consequence, the wind turbine represented by curve 10 as well as the wind turbine represented by curve 11 reach the design lifetime at time $t_3$. Typically, all wind turbines in an offshore wind farm are decommissioned at the same time, and hence a premature required decommissioning of the farm at $t_4$, due to the turbine following wear line 10 and 10a, is extended to $t_3$ leading to a great increase in lifetime energy production of the farm before decommissioning.

The invention claimed is:

1. A method for operating at least two floating offshore wind turbines, each wind turbine being connected to a first mooring arrangement at a respective first operating position, the method comprising the steps of:
   operating the wind turbines at their respective first operating positions,
   for each of the wind turbines, estimating a previous and/or a future expected wear impact on the wind turbine,
   identifying at least one wind turbine of the at least two wind turbines to be relocated to a respective second operating position, based on the estimated wear impact,
   disconnecting each identified wind turbine from the first mooring arrangement of its first operating position,
   moving each identified wind turbine from its respective first operating position to its respective second operating position,
   connecting each identified wind turbine to a second mooring arrangement at its respective second operating position, and
   operating each identified wind turbine at its respective second operating position.

2. The method according to claim 1, wherein the step of estimating a previous and/or a future expected wear impact on each of the wind turbines is based on a location of the operating positions of the wind turbines relative to a prevailing wind direction.

3. The method according to claim 1, wherein the step of estimating a previous and/or a future expected wear impact on each of the wind turbines comprises estimating a lifetime usage of each of the wind turbines.

4. The method according to claim 1, wherein the step of estimating previous and/or future expected wear impact comprises modelling meteorological and/or oceanic conditions, and estimating future expected wear impact based on the modelling.

5. The method according to claim 1, wherein the step of estimating previous and/or future expected wear impact is performed on the basis of sensor data obtained at the respective first and/or second operating positions.

6. The method according to claim 1, wherein the step of identifying at least one wind turbine comprises identifying at least one wind turbine with an experienced high wear impact, and wherein the step of moving each identified wind turbine comprises moving the at least one wind turbine with a high wear impact to a second operating position which provides an expected future wear impact which is lower than an expected future wear impact at the first operating position of the wind turbine.

7. The method according to claim 1, wherein the step of identifying at least one wind turbine comprises identifying at least one wind turbine with a low wear impact, and wherein the step of moving each identified wind turbine comprises moving the at least one wind turbine with a low wear impact to the second operating position which provides an expected future wear impact which is higher than an expected future wear impact at the first operating position of the wind turbine.

8. The method according to claim 1, further comprising the step of performing maintenance on at least one wind turbine and/or replacing or upgrading at least one component of at least one wind turbine.

9. The method according to claim 8, wherein the step of performing maintenance and/or replacing or upgrading at least one component is performed after the step of operating the wind turbines at their respective first operating positions and before the step of operating the wind turbines at their respective second operating positions.

10. The method according to claim 1, wherein the respective second operating position of at least one wind turbine is a respective first operating position of another wind turbine.

11. The method according to claim 1, further comprising the steps of:
- disconnecting the at least one wind turbine from the second mooring arrangement of its respective second operating position,
- moving the at least one wind turbine from its respective second operating position to a respective third operating position,
- connecting the at least one wind turbine to a third mooring arrangement at the respective third operating position, and
- operating the at least one wind turbine at the respective third operating position.

12. The method according to claim 1, wherein the step of estimating a previous and/or a future expected wear impact on the at least one wind turbine is performed after an extreme event selected from the group of a tsunami, a typhoon, a failure of a component of the at least one wind turbine, a volcanic particle impact event, and a bird or insect migration impact event.

13. The method according to claim 1, wherein the first operating position is in a first wind farm and the second operating position is in a second wind farm different from the first wind farm for at least one of the floating wind turbines.

* * * * *